United States Patent
Tanaka

[11] Patent Number: 5,229,886
[45] Date of Patent: Jul. 20, 1993

[54] ZOOM LENS
[75] Inventor: Tsunefumi Tanaka, Kanagawa, Japan
[73] Assignee: Canon Kabushiki Kaisha, Tokyo, Japan
[21] Appl. No.: 834,808
[22] Filed: Feb. 13, 1992
[30] Foreign Application Priority Data Feb. 19, 1991 [JP] Japan .................. 3-046119

[51] Int. Cl.⁵ .............................................. G02B 15/14
[52] U.S. Cl. ................................... 359/683; 359/676
[58] Field of Search .................. 359/683, 676, 708

[56] References Cited

U.S. PATENT DOCUMENTS

| | | | |
|---|---|---|---|
| 3,771,853 | 11/1973 | Nakamura | 359/686 |
| 4,516,839 | 5/1985 | Tokumaru | 359/686 |
| 4,527,867 | 7/1985 | Fujioka et al. | 359/683 |
| 4,776,680 | 10/1988 | Tanaka | 359/686 |
| 4,781,446 | 11/1988 | Tanaka et al. | 359/680 |
| 4,830,477 | 5/1989 | Takahashi et al. | 359/683 |
| 4,865,434 | 9/1989 | Matsushita et al. | 359/690 |
| 5,059,007 | 10/1991 | Tanaka | 359/676 |

FOREIGN PATENT DOCUMENTS 49-23912 6/1974 Japan .
53-34539 3/1978 Japan .
57-163213 10/1982 Japan .
58-4113 1/1983 Japan .

Primary Examiner—Scott J. Sugarman
Attorney, Agent, or Firm—Fitzpatrick, Cella, Harper & Scinto

[57] ABSTRACT

A zoom lens is disclosed, comprising, from front to rear, first lens unit of negative refractive power, a second lens unit of positive refractive power, a third lens unit of negative refractive power, a fourth lens unit of positive refractive power and a fifth lens unit of positive refractive power, the second and fourth lens units moving forward to vary the focal length from the wide-angle end to the telephoto end, and the first lens unit moving in a locus convex toward the image side to compensate for the image shift with zooming, wherein the following conditions are satisfied:

$$f2 < |f3|$$

$$f5 < 5 \cdot fT$$

where fi is the focal length of the i-th lens unit and fT is the longest focal length of the entire lens system.

9 Claims, 8 Drawing Sheets

ZOOM LENS

BACKGROUND OF THE INVENTION

1. Field of the Invention

This invention relates to zoom lenses suited to single-lens reflex cameras or video cameras and, more particularly, to a relatively wide-angle and high-range zoom lens having a leading lens unit of negative refractive power, i.e., a so-called negative-lead-type zoom lens having five lens units in total.

2. Description of the Related Art

The negative-lead-type zoom lens has the advantage of increasing the maximum of the angular field to a relatively high value with ease and decreasing the minimum object distance at which close-up photography can be performed. However, on the other hand, it has drawbacks in that the aperture opening needs to be large in diameter and the range of variation of the focal length is difficult to extend.

To achieve a minimization of the size of the entirety of the lens system and a great extension of the range of focal lengths by improving those drawbacks, proposals have been made in, for example, Japanese Patent Publication No. Sho 49-23912 and Japanese Laid-Open Patent Applications Nos. Sho 53-34539, Sho 57-163213 and Sho 58-4113.

In every one of these cited examples, the zoom lens is constructed from lens units of negative, positive, negative and positive refractive powers in this order from the object side, totaling four lens units. Of these, certain lens units are made to move in proper relation when zooming.

Recently, there has arisen a demand for an increase of the zoom ratio with inclusion of wide angles of field coverage with respect to the standard zoom lens for the single-lens reflex camera or video camera. For example, a focal length range of from 35 to 70 mm in the 35 mm format and an even wider range of from 28 to 70 mm are already employed in the standard zoom lenses for the single-lens reflex camera.

More recently, a much desired extension of the range toward the telephoto side with increase of the zoom ratio to a range of from 28 to 80 mm, or from 28 to 85 mm is attempted in the standard zoom lenses.

If such a wide angular field of coverage and such a high zoom ratio are attained, however, a problem arises in that the lens gets a long total length. Another problem arises in that the relation in which the lens components move to vary the focal length becomes complicated. As a result, the lens barrel structure has to be in the form of an increased number of layers. This leads to an increase in the bulk and size of the lens barrel and the complexity of structure of the operating mechanism.

SUMMARY OF THE INVENTION

According to the invention, a zoom lens is composed of five lens units as a whole and appropriate conditions for the refractive powers of the lens units and for the relation in which the lens units move to vary the focal length are set forth, so that the total length of the lens is shortened and the bulk and size and the complexity of structure of the lens barrel are prevented from increasing as the maximum angular field and the zooming range increase. It is, therefore, an object of the invention to provide a zoom lens which has relatively wide angles of field coverage and gets a great increase of the zoom ratio, while still maintaining a high optical performance over the entire extended range of variation of the focal length.

The zoom lens according to the invention comprises, in the order from the object side, a first lens unit of negative refractive power, a second lens unit of positive refractive power, a third lens unit of negative refractive power, a fourth lens unit of positive refractive power and a fifth lens unit of positive refractive power, the second and fourth lens units, when varying the focal length from the wide-angle end to the telephoto end, being moved toward the object side, while the first lens unit is moved in a locus convex toward the image side to compensate for the shift of an image plane with zooming, wherein, letting the focal length of the i-th lens unit be denoted by fi and the longest focal of the entire lens system be denoted by fT, the following conditions are satisfied:

$$f2 < |f3|$$

$$f5 < 5 \cdot fT$$

DETAILED DESCRIPTION OF THE PREFERRED EMBODIMENTS

Figures 1A, 1B:
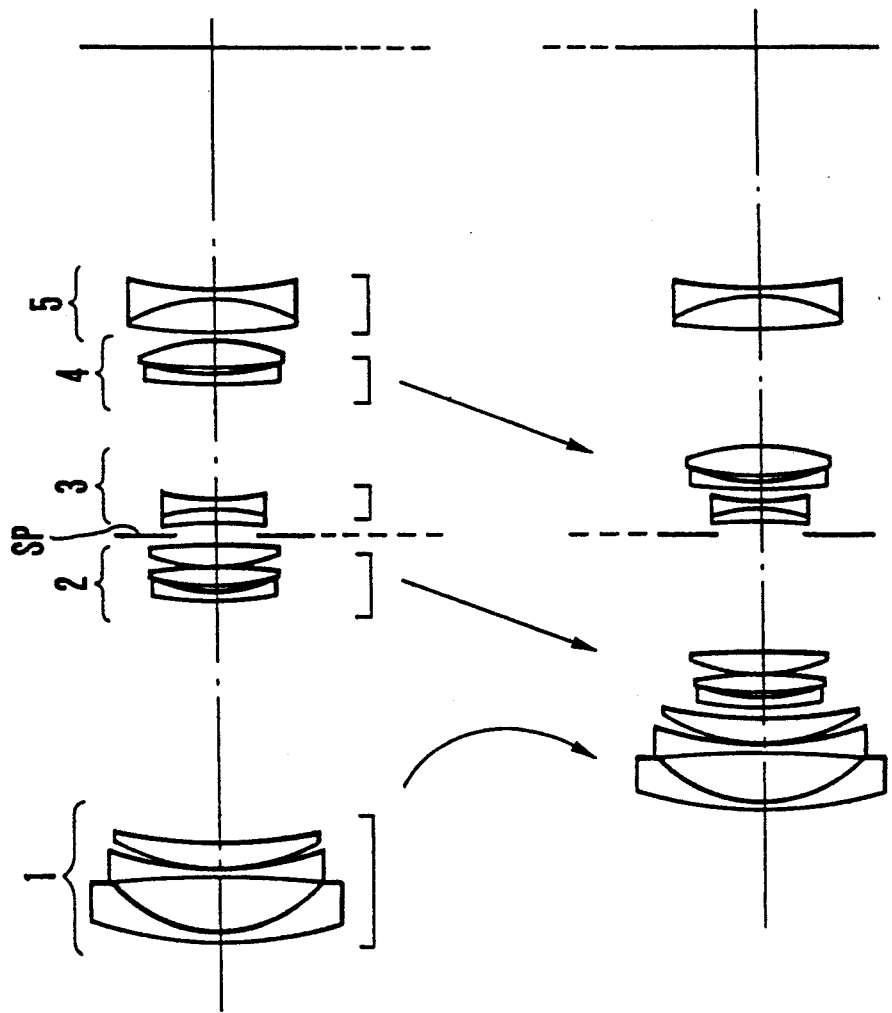
FIG. 1 is a longitudinal section view of a numerical example 1 of a zoom lens of the invention.
Figures 2A, 2B:
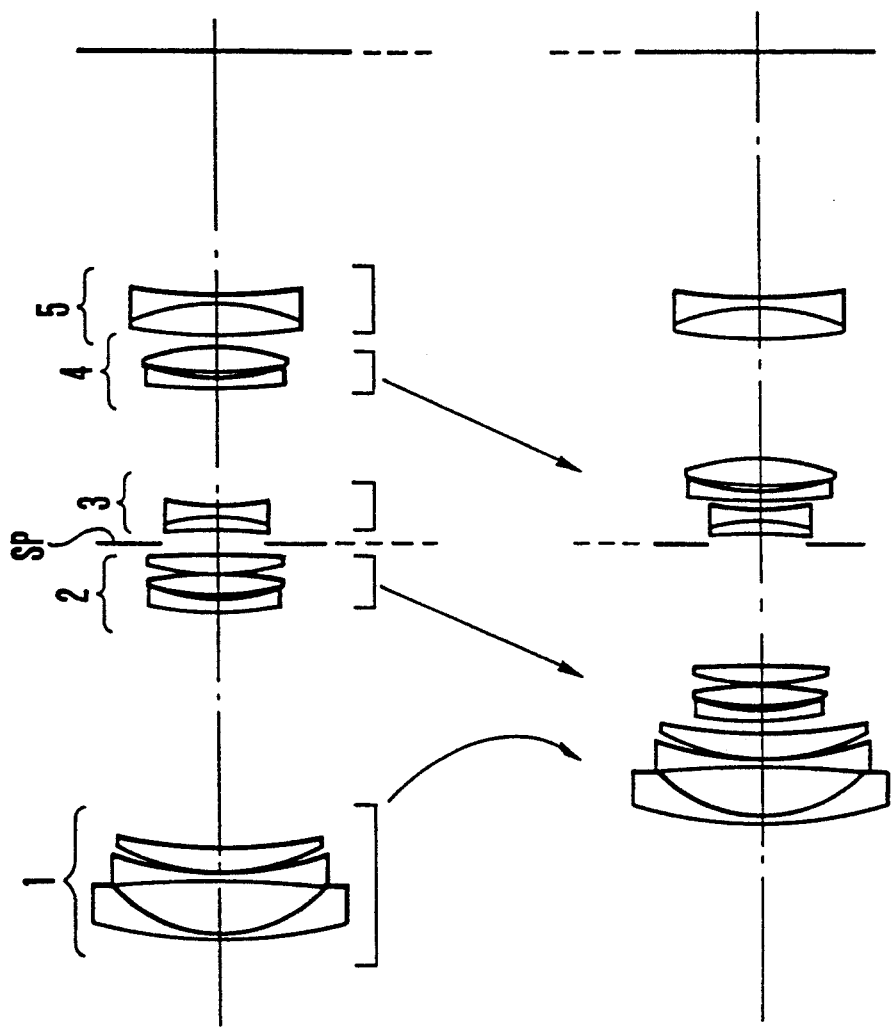
FIG. 2 is a longitudinal section view of a numerical example 2 of a zoom lens of the invention.
Figures 3A, 3B:
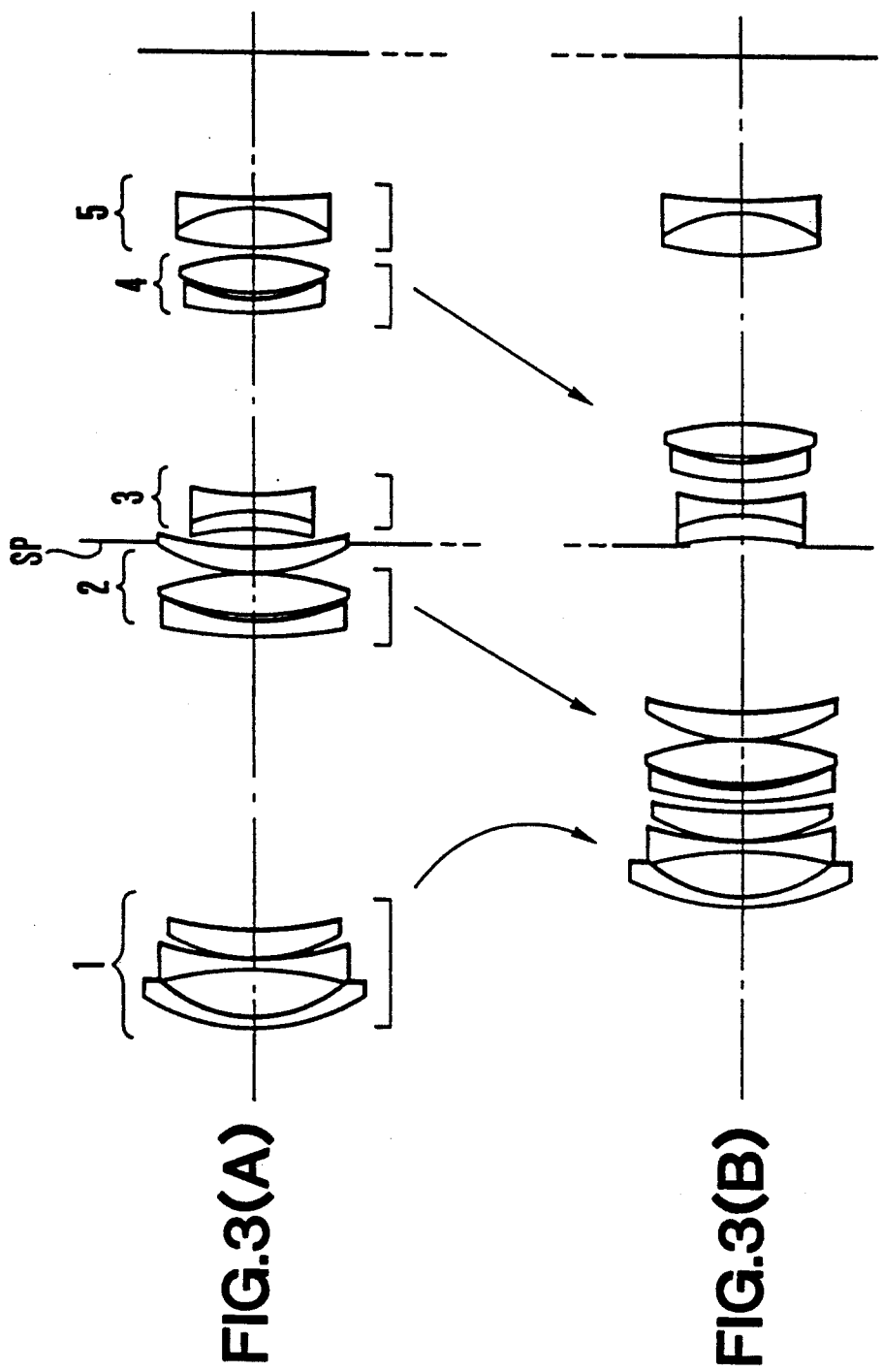
FIG. 3 is a longitudinal section view of a numerical example 3 of a zoom lens of the invention.
Figure 4:
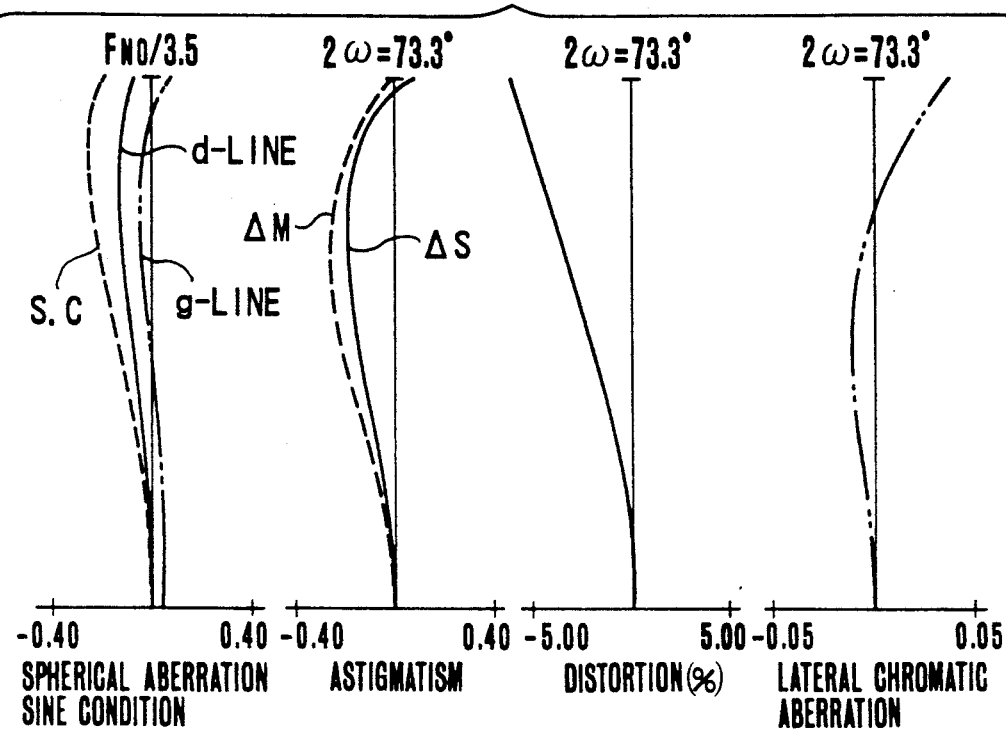
FIG. 4 shows graphic representations of the various aberrations of the numerical example 1 of the invention in a zooming position for the wide-angle end.
Figure 5:
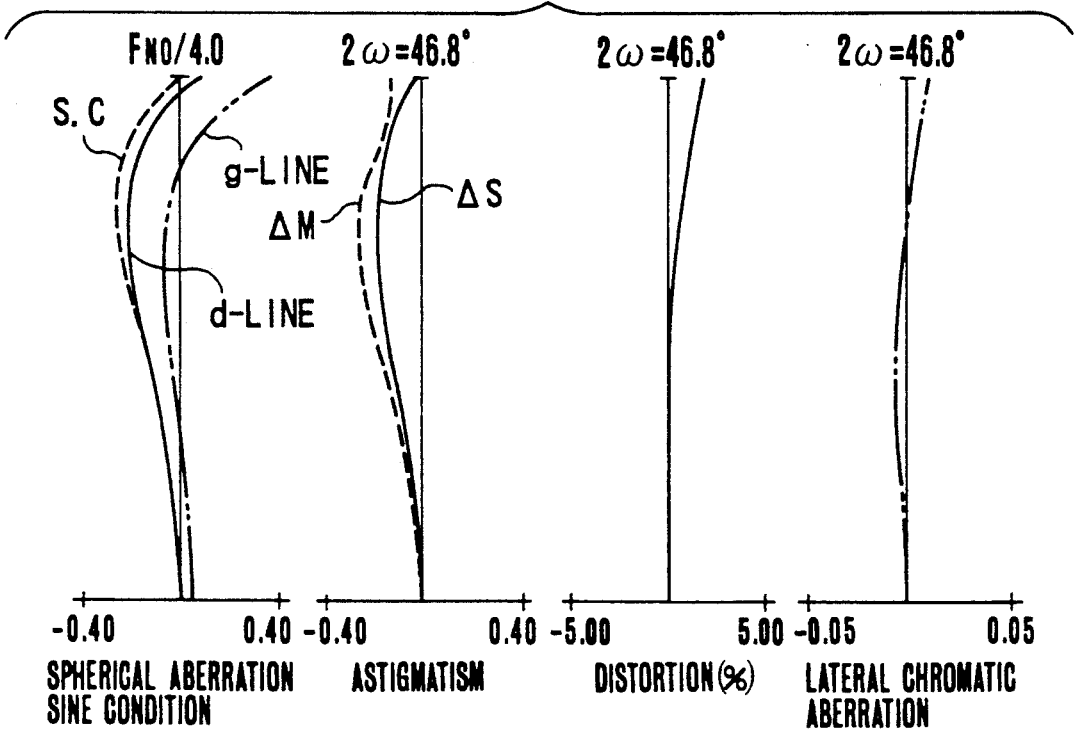
FIG. 5 shows graphic representations of the various aberrations of the numerical example 1 of the invention in an intermediate zooming position.
Figure 6:
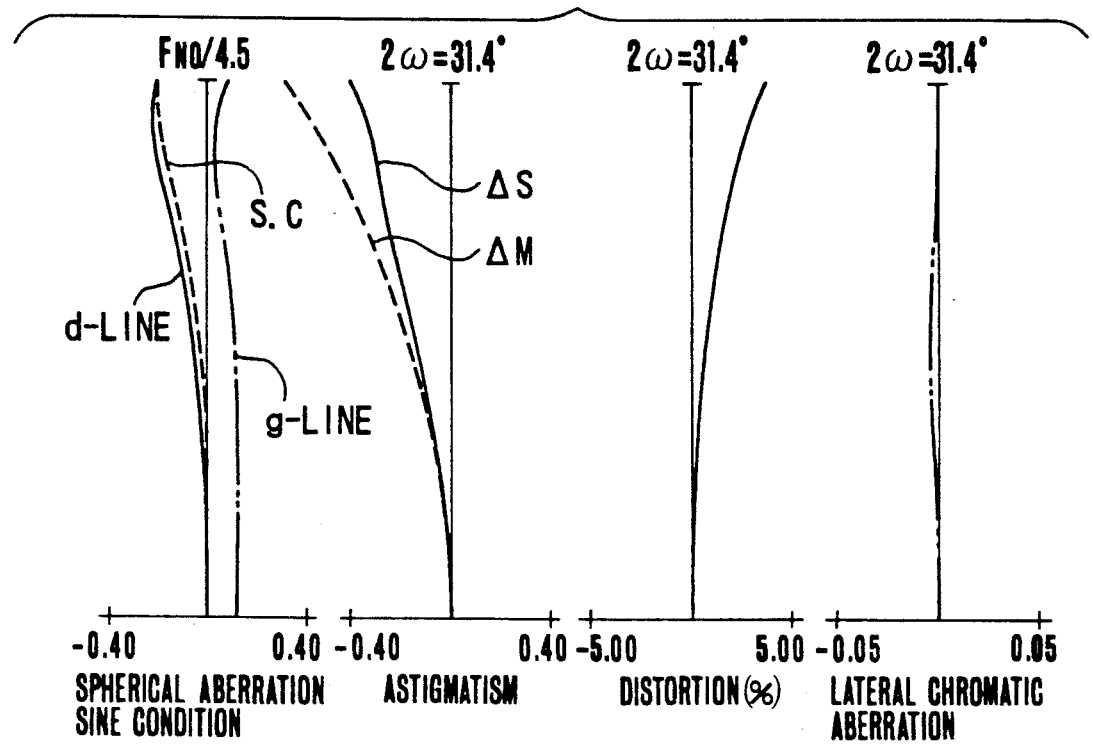
FIG. 6 shows graphic representations of the various aberrations of the numerical example 1 of the invention in another zooming position for the telephoto end.
Figure 7:
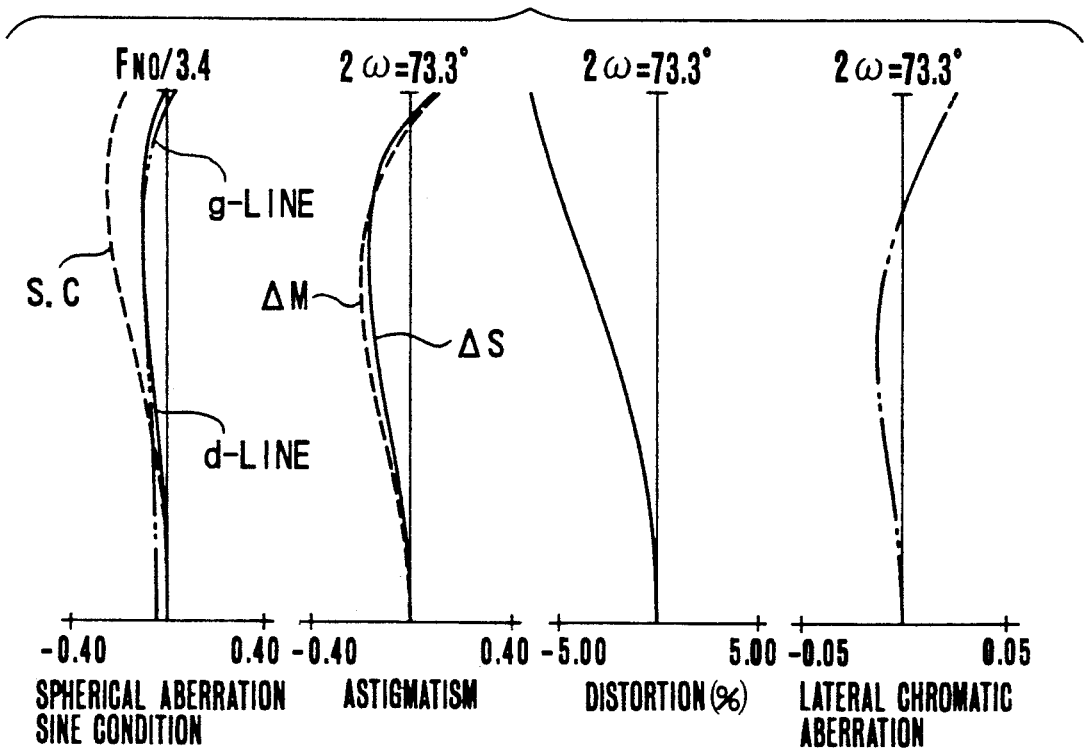
FIG. 7 shows graphic representations of the various aberrations of the numerical example 2 of the invention in a zooming position for the wide-angle end.
Figure 8:
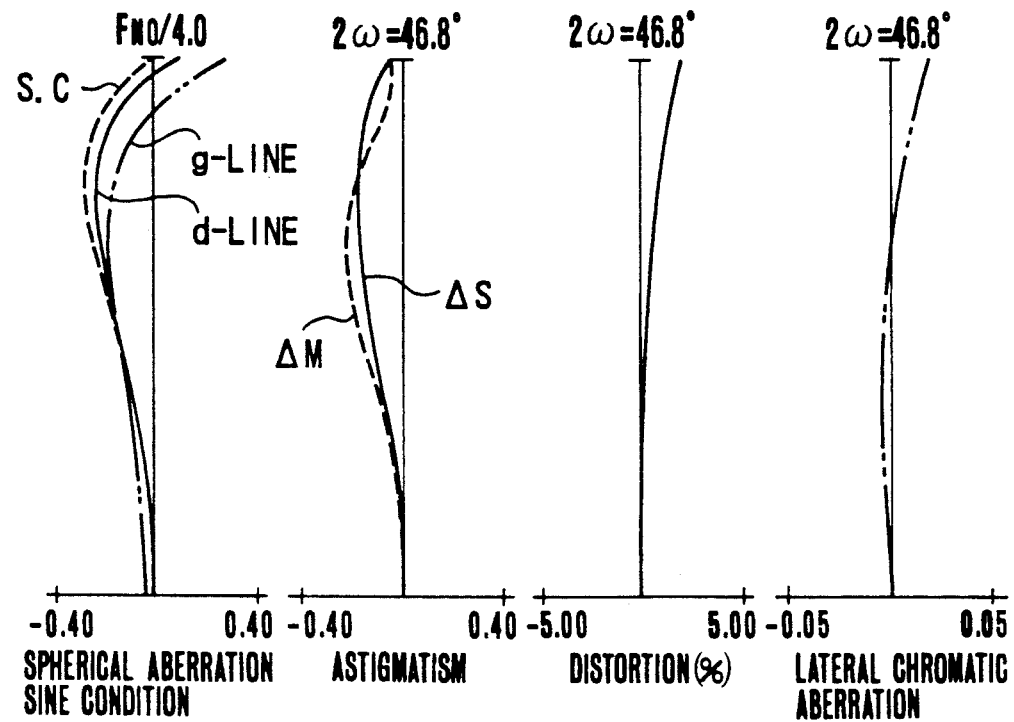
FIG. 8 shows graphic representation of the various aberrations of the numerical example 2 of the invention in an intermediate zooming position.
Figure 9:
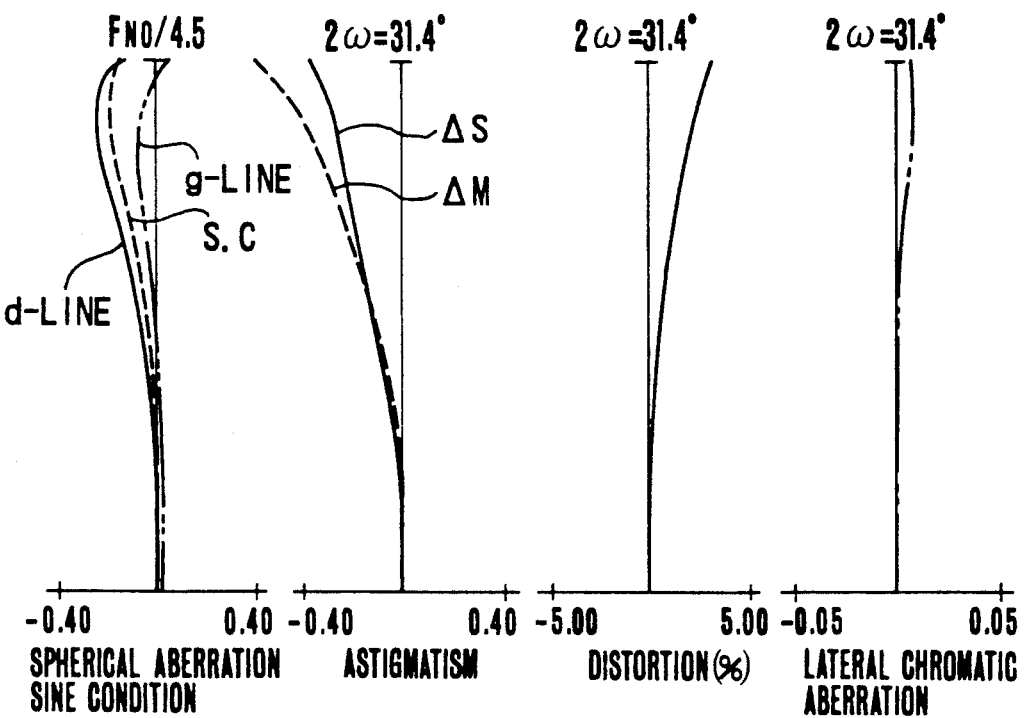
FIG. 9 shows graphic representations of the various aberrations of the numerical example 2 of the invention in another zooming position for the telephoto end.
Figure 10:
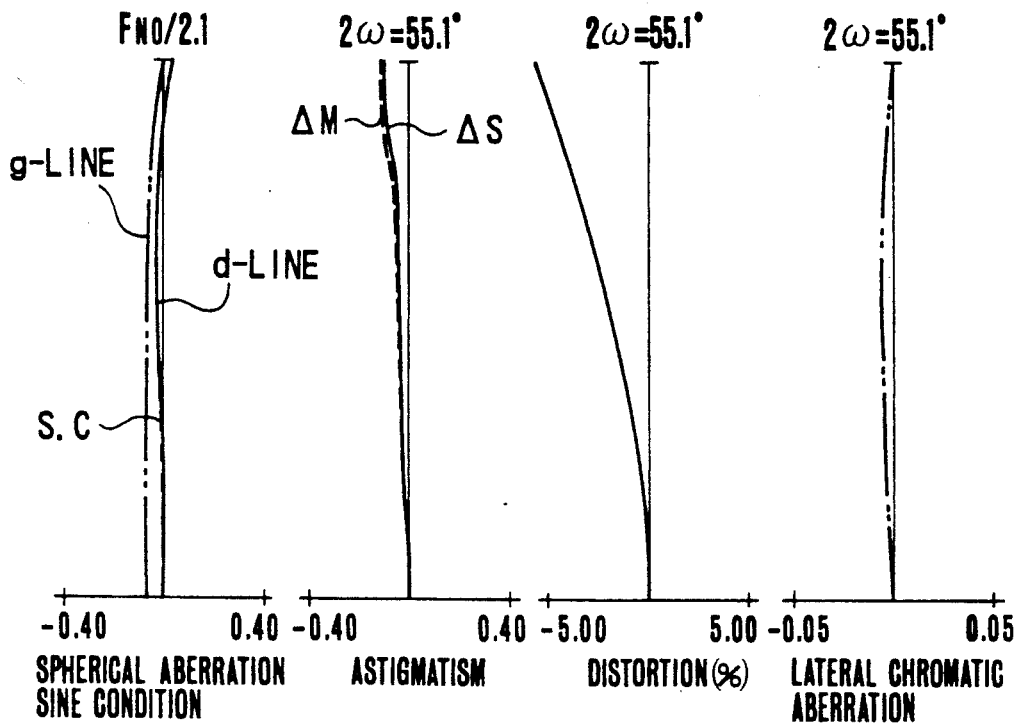
FIG. 10 shows graphic representations of the various aberrations of the numerical example 3 of the invention in a zooming position for the wide-angle end.
Figure 11:
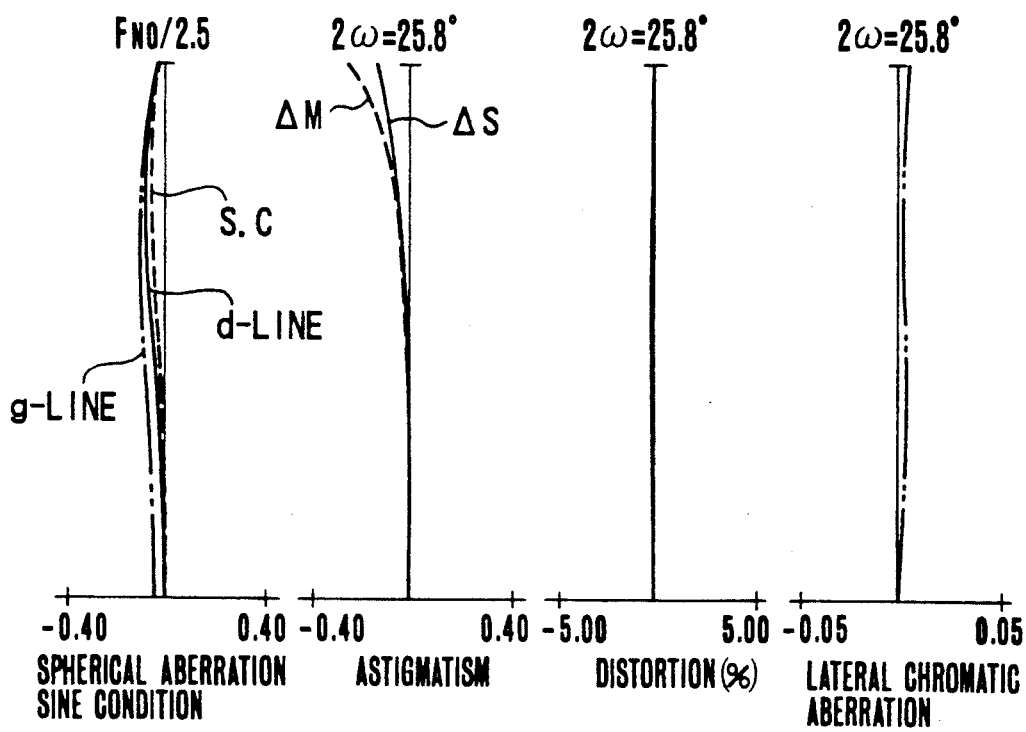
FIG. 11 shows graphic representations of the various aberrations of the numerical example 3 of the invention in an intermediate zooming position.
Figure 12:
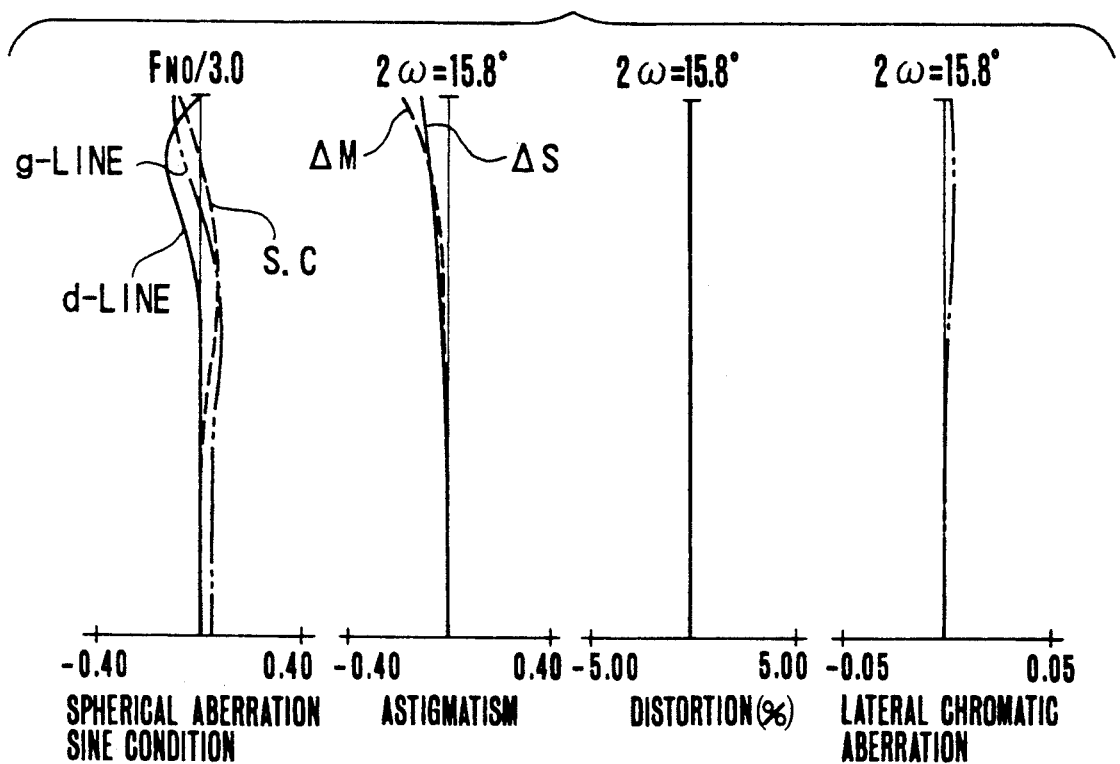
FIG. 12 shows graphic representations of the various aberrations of the numerical example 3 of the invention in another zooming position for the telephoto end.

Referring to FIGS. 1 to 3, the zoom lens comprises a first lens unit 1 of negative refractive power, a second lens unit 2 of positive refractive power, a third lens unit 3 of negative refractive power, a fourth lens unit 4 of positive refractive power and a fifth lens unit 5 of positive refractive power. SP stands for a stop. Arrows indicate the directions of movement of the lens units when zooming from the wide-angle end to the telephoto end.

With such a predetermined power arrangement of the five lens units of the zoom lens, the present embodiment has another feature that, when zooming from the wide-angle end to the telephoto end, as shown in FIGS. 1 to 3, the second and fourth lens units are made to move toward the object side by the same amount, as they are, for example, united to each other, while the shift of an image plane with zooming is compensated for by making the first lens unit movable so as to have a locus convex toward the image side. Another feature is that the third and fifth lens units are made stationary during zooming. Thus, the number of lens units movable for zooming is taken substantially at 2 to thereby achieve a great simplification of the structure of the lens mounting mechanism.

Still another feature of the invention is that, letting the focal length of the i-th lens unit be denoted by fi and the longest focal length of the entire lens system be denoted by fT, the zoom lens satisfies the following conditions:

$$f2 < |f3| \qquad (1)$$

$$f5 < 5 \cdot fT \qquad (2)$$

It is to be understood that, in the present embodiment, while defining the refractive powers of the respective lens units and the movements of the respective zooming lens units as described above, the conditions (1) and (2) are set forth. When the values of refractive powers of the lens units fall within the ranges given by the inequalities of conditions (1) and (2), a zoom lens is obtained whose total length is shortened and which has the maximum of the image angle increased and nevertheless takes a high zoom ratio, while still maintaining high optical performance throughout the entire zooming range.

The technical significances of the conditions (1) and (2) are explained below.

The inequality of condition (1) sets a proper magnitude relationship of the refractive powers of the second and third lens units and has an aim chiefly to advantageously obtain the predetermined zoom ratio under the condition that the total length of the entire lens system is shortened.

That is, the refractive power of the second lens unit is made stronger than the absolute value of the refractive power of the third lens unit, so that a predetermined zoom ratio is obtained without having to increase the total zooming movement of the second lens unit. This leads to a decreased separation between any successive two of the lens units on the wide angle-and telephoto sides. Thus, the total length is shortened. The increase of the positive refractive power of the second lens unit also causes the diameter of the light beam emerging from the second lens unit to decrease on the telephoto side. This leads to a decreased diameter of the stop arranged behind the second lens unit. Thus, the diameter of the outer barrel of the zoom lens is decreased. If the condition (1) is violated, it will become difficult to get these advantages.

The inequality of condition (2) is concerned with the refractive power of the fifth lens unit that is stationary during zooming, and has an aim chiefly to accept the measure of shortening the total length and get a high optical performance by well correcting the residual aberrations from the first to fourth lens units.

In more detail, to shorten the total length of the lens, the refractive power of every one of the first to fourth lens units may be strengthened. In proportion to that, the amount of aberrations produced from any of the lens units then increases. Accordingly, the fifth lens unit is used and the refractive power of the fifth lens unit is determined so as to satisfy the condition (2) in order to correct the various aberrations of the entire lens system in good balance. Thus, good optical performance is obtained over the entire zooming range. When the condition (2) is violated, all the aberrations become difficult to correct in good balance.

The features described above suffice for accomplishing the object of the invention. To further improve the correction of the various aberrations in good balance for a higher optical performance over the entire zooming range, it is preferred to construct each of the lens units of the zoom lens in the following manner:

(i) The first lens unit comprises, in the order from the object side, a negative first lens of meniscus form concave toward the image side, a negative second lens, and a positive third lens of meniscus form convex toward the object side. This allows the lens unit to take a small outer diameter. As the minimum of the object distances which can be photographed shortens, the resultant various aberrations are also corrected well.

(ii) The second lens unit comprises, in the order from the object side, a negative first lens of meniscus form concave toward the image side, a positive second lens and a positive third lens. This minimizes the various aberrations produced from the second lens unit as the positive refractive power of the second lens unit increases since this is advantageous for obtaining a predetermined zoom ratio. Particularly, an air lens formed between the first and second lenses in the second lens unit is useful for correcting the various aberrations in good balance.

(iii) The third lens unit comprises a cemented lens composed of a positive first lens and a negative second lens. This makes the entire lens system to take a proper value of the Petzval sum. Thus, the image surface characteristics are corrected well. The chromatic aberrations of the entire lens system are also made easy to correct.

(iv) The fourth lens unit comprises, in the order from the object side, a negative first lens of meniscus form concave toward the image side and a positive second lens of bi-convex form. This compensates for the decrease of the degree of freedom on aberration correction which results from the unified movement of the second and fourth lens units. Particularly, a controlled shape of the air lens formed between the first and second lenses in the fourth lens unit assists in well correcting the variation of the aberrations with zooming.

(v) The fifth lens unit comprises a positive first lens and a negative second lens. Particularly, the order of the positive lens followed by the negative lens, when used, assists in well correcting the under-correction of the distortion on the wide-angle side due to the use of the negative refractive power in the first lens unit.

It should be noted that, in the invention, focusing is performing by axially moving the first lens unit.

Next, numerical examples 1 to 3 of the invention are shown. In the numerical data of the examples 1 to 3, Ri is the radius of curvature of the i-th lens surface when counted from the object side, Di is the i-th lens thickness or air separation when counted from the object side, and Ni and νi are respectively the refractive index and Abbe number of the glass of the i-th lens element when counted from the object side.

The shape of an aspheric surface is expressed in the coordinates with an X axis in the axial direction and an H axis in a direction perpendicular to the optical axis, the direction in which light advances being taken as positive, by the following equation:

$$X=(1/R)H^2/(1+(1-(H/R)^2)^{1/2})+AH^2+BH^4+CH^6+DH^8+EH^{10}$$

where R is the radius of the osculating sphere and A, B, C, D and E are the aspheric coefficients.

Numerical Example 1 (FIGS. 1, 4, 5 and 6):
F = 29.1–76.8   FNO = 1:3.5–4.5   2ω = 73.3°–31.4°

| | | | |
|---|---|---|---|
| R1 = 76.09 | D1 = 1.80 | N1 = 1.77250 | ν1 = 49.6 |
| R2 = 25.14 | D2 = 6.81 | | |
| R3 = −322.19 | D3 = 1.60 | N2 = 1.77250 | ν2 = 49.6 |
| R4 = 49.12 | D4 = 0.10 | | |
| R5 = 34.66 | D5 = 3.90 | N3 = 1.80518 | ν3 = 25.4 |
| R6 = 89.23 | D6 = Variable | | |
| R7 = 61.74 | D7 = 1.50 | N4 = 1.84666 | ν4 = 23.8 |
| R8 = 26.10 | D8 = 0.07 | | |
| R9 = 26.90 | D9 = 4.00 | N5 = 1.69680 | ν5 = 55.5 |
| R10 = −104.36 | D10 = 0.10 | | |
| R11 = 36.87 | D11 = 3.15 | N6 = 1.69680 | ν6 = 55.5 |
| R12 = −277.30 | D12 = Variable | | |
| R13 = Stop | D13 = 1.75 | | |
| R14 = −53.76 | D14 = 2.10 | N7 = 1.80518 | ν7 = 25.4 |
| R15 = −27.00 | D15 = 1.30 | N8 = 1.60311 | ν8 = 60.7 |
| R16 = 41.77 | D16 = Variable | | |
| R17 = 133.79 | D17 = 1.30 | N9 = 1.80518 | ν9 = 25.4 |
| R18 = 38.38 | D18 = 0.42 | | |
| R19 = 51.77 | D19 = 4.50 | N10 = 1.58313 | ν10 = 59.4 |
| R20 = −36.06 | D20 = Variable | | |
| R21 = 138.52 | D21 = 5.20 | N11 = 1.65844 | ν11 = 50.9 |
| R22 = −28.77 | D22 = 1.30 | N12 = 1.56732 | ν12 = 42.8 |
| R23 = 99.83 | | | |

20th Surface: Aspherical
Values of Aspheric Coefficients

A = 0
B = 3.269 × 10⁻⁶
C = −1.442 × 10⁻⁹
D = 1.23 × 10⁻¹⁰
E = −5.009 × 10⁻¹³

| Variable Separation | Focal Length | | |
|---|---|---|---|
| | 76.80 | 49.85 | 29.09 |
| D 6 | 1.21 | 12.96 | 38.22 |
| D 12 | 19.70 | 10.12 | 2.24 |
| D 16 | 1.72 | 11.30 | 19.18 |
| D 20 | 20.00 | 10.42 | 2.54 |

Numerical Example 2 (FIGS. 2, 7, 8 and 9):
F = 29.1–76.8   FNO = 1:3.5–4.5   2ω = 73.3°–31.4°

| | | | |
|---|---|---|---|
| R1 = 76.09 | D1 = 1.80 | N1 = 1.77250 | ν1 = 49.6 |
| R2 = 25.76 | D2 = 6.81 | | |
| R3 = −456.58 | D3 = 1.60 | N2 = 1.77250 | ν2 = 49.6 |
| R4 = 46.73 | D4 = 0.10 | | |
| R5 = 34.26 | D5 = 3.90 | N3 = 1.80518 | ν3 = 25.4 |
| R6 = 81.90 | D6 = Variable | | |
| R7 = 61.74 | D7 = 1.50 | N4 = 1.80518 | ν4 = 25.4 |
| R8 = 24.30 | D8 = 0.12 | | |
| R9 = 25.04 | D9 = 4.00 | N5 = 1.69680 | ν5 = 55.5 |
| R10 = −119.88 | D10 = 0.10 | | |
| R11 = 37.25 | D11 = 3.15 | N6 = 1.69680 | ν6 = 55.5 |
| R12 = −239.59 | D12 = Variable | | |
| R13 = (Stop) | D13 = 1.75 | | |
| R14 = −53.76 | D14 = 2.10 | N7 = 1.80518 | ν7 = 25.4 |
| R15 = −27.21 | D15 = 1.30 | N8 = 1.60311 | ν8 = 60.7 |
| R16 = 41.94 | D16 = Variable | | |
| R17 = 133.79 | D17 = 1.30 | N9 = 1.80518 | ν9 = 25.4 |
| R18 = 37.73 | D18 = 0.42 | | |
| R19 = 48.38 | D19 = 4.50 | N10 = 1.58313 | ν10 = 59.4 |
| R20 = −37.00 | D20 = Variable | | |
| R21 = 138.52 | D21 = 5.20 | N11 = 1.65844 | ν11 = 50.9 |
| R22 = −30.71 | D22 = 1.30 | N12 = 1.56732 | ν12 = 42.8 |
| R23 = 107.87 | | | |

20th Surface: Aspherical
Values of Aspheric Coefficients

A = 0
B = 3.269 × 10⁻⁶
C = −1.442 × 10⁻⁹
D = 1.123 × 10⁻¹⁰
E = −5.009 × 10⁻¹³

| Variable Separation | Focal Length | | |
|---|---|---|---|
| | 76.80 | 49.69 | 28.95 |
| D 6 | 1.46 | 13.21 | 38.47 |
| D 12 | 19.72 | 10.15 | 2.26 |
| D 16 | 1.80 | 11.38 | 19.26 |
| D 20 | 20.00 | 10.42 | 2.54 |

Numerical Example 3 (FIGS. 3, 10, 11 and 12):
F = 6.1–23   FNO = 1:2.1–3   2ω = 55.1°–15.8°

| | | | |
|---|---|---|---|
| R1 = 12.94 | D1 = 0.72 | N1 = 1.77250 | ν1 = 49.6 |
| R2 = 7.65 | D2 = 2.04 | | |
| R3 = −30.38 | D3 = 0.72 | N2 = 1.77250 | ν2 = 49.6 |
| R4 = 16.88 | D4 = 0.12 | | |
| R5 = 11.83 | D5 = 1.44 | N3 = 1.80518 | ν3 = 25.4 |
| R6 = 20.68 | D6 = Variable | | |
| R7 = 22.37 | D7 = 0.72 | N4 = 1.80518 | ν4 = 25.4 |
| R8 = 10.08 | D8 = 0.06 | | |
| R9 = 10.52 | D9 = 2.76 | N5 = 1.69680 | ν5 = 55.5 |
| R10 = −14.90 | D10 = 0.06 | | |
| R11 = 9.98 | D11 = 1.44 | N6 = 1.69680 | ν6 = 55.5 |
| R12 = 19.93 | D12 = Variable | | |
| R13 = (Stop) | D13 = 0.60 | | |
| R14 = −15.97 | D14 = 1.20 | N7 = 1.78472 | ν7 = 25.7 |
| R15 = −8.87 | D15 = 0.72 | N8 = 1.60311 | ν8 = 60.7 |
| R16 = 12.82 | D16 = Variable | | |
| R17 = 18.70 | D17 = 0.72 | N9 = 1.80518 | ν9 = 25.4 |
| R18 = 7.37 | D18 = 0.12 | | |
| R19 = 7.84 | D19 = 2.16 | N10 = 1.58913 | ν10 = 61.2 |
| R20 = −17.30 | D20 = Variable | | |
| R21 = 20.49 | D21 = 2.16 | N11 = 1.65844 | ν11 = 50.9 |
| R22 = −7.57 | D22 = 0.72 | N12 = 1.56732 | ν12 = 42.8 |
| R23 = 99.35 | | | |

| Variable Separation | Focal Length | | |
|---|---|---|---|
| | 23.04 | 13.99 | 6.13 |
| D 6 | 0.54 | 3.86 | 16.17 |
| D 12 | 9.30 | 4.80 | 0.30 |
| D 16 | 1.03 | 5.53 | 10.03 |
| D 20 | 9.60 | 5.10 | 0.60 |

According to the invention, the refractive powers of the five lens units and the relation in which the lens units move to effect zooming are specified as described above, thereby making it possible to achieve a zoom lens which fulfills at once the requirements of shortening the total length of the lens, of simplifying the structure of the lens barrel, of increasing the maximum image angle to a relatively high value, of increasing the zoom ratio and of maintaining high optical performance over the entire extended zooming range.

What is claimed is:
1. A zoom lens comprising:
in the order from an object side,
a first lens unit having a negative refractive power;
a second lens unit having a positive refractive power;
a third lens unit having a negative refractive power;
a fourth lens unit having a positive refractive power; and
a fifth lens unit having a positive refractive power,
wherein each of separations between successive two of said first, second, third, fourth and fifth lens units is varied when zooming is performed, and the following conditions are satisfied:

$f_2 < |f_3|$ $f_3 < 5 \cdot f_T$ where $f_2$, $f_3$ and $f_5$ are the focal lengths of said second, third and fifth lens units, respectively, and $f_T$ is the longest focal length of the entire lens system.

2. A zoom lens according to claim 1, wherein said first, second and fourth lens units are made to move to effect zooming.

3. A zoom lens according to claim 2, wherein zooming from a wide-angle end to a telephoto end is performed by moving said second and fourth lens units toward the object side and moving said first lens unit so as to depict a locus convex toward an image side.

4. A zoom lens according to claim 2, wherein said second and fourth lens units are made to move in unison.

5. A zoom lens according to claim 1, wherein said first lens unit comprises, in the order from the object side, a negative first lens of meniscus form concave toward an image side, a negative second lens, and a positive third lens of meniscus form convex toward the object side.

6. A zoom lens according to claim 5, wherein said second lens unit comprises, in the order from the object side, a negative first lens of meniscus form concave toward the image side, a positive second lens and positive third lens.

7. A zoom lens according to claim 6, wherein said third lens unit comprises a cemented lens composed of a positive first lens and a negative second lens.

8. A zoom lens according to claim 7, wherein said fourth lens unit comprises, in the order from the object side, a negative first lens of meniscus form concave toward the image side and a positive second lens of bi-convex form.

9. A zoom lens according to claim 8, wherein said fifth lens unit comprises a positive first lens and a negative second lens.

* * * * *

UNITED STATES PATENT AND TRADEMARK OFFICE
CERTIFICATE OF CORRECTION

PATENT NO. : 5,229,886
DATED : July 20, 1993
INVENTOR(S) : TSUNEFUMI TANAKA

It is certified that error appears in the above-indentified patent and that said Letters Patent is hereby corrected as shown below:

COLUMN 3:
line 54, "wide angle-and" should read --wide-angle and--.

COLUMN 5:
line 40, "$D = 1.23 \times 10^{-10}$" should read --$D = 1.123 \times 10^{-10}$--.

Signed and Sealed this

Seventh Day of June, 1994

Attest:

BRUCE LEHMAN

Attesting Officer

Commissioner of Patents and Trademarks